Patented May 19, 1953

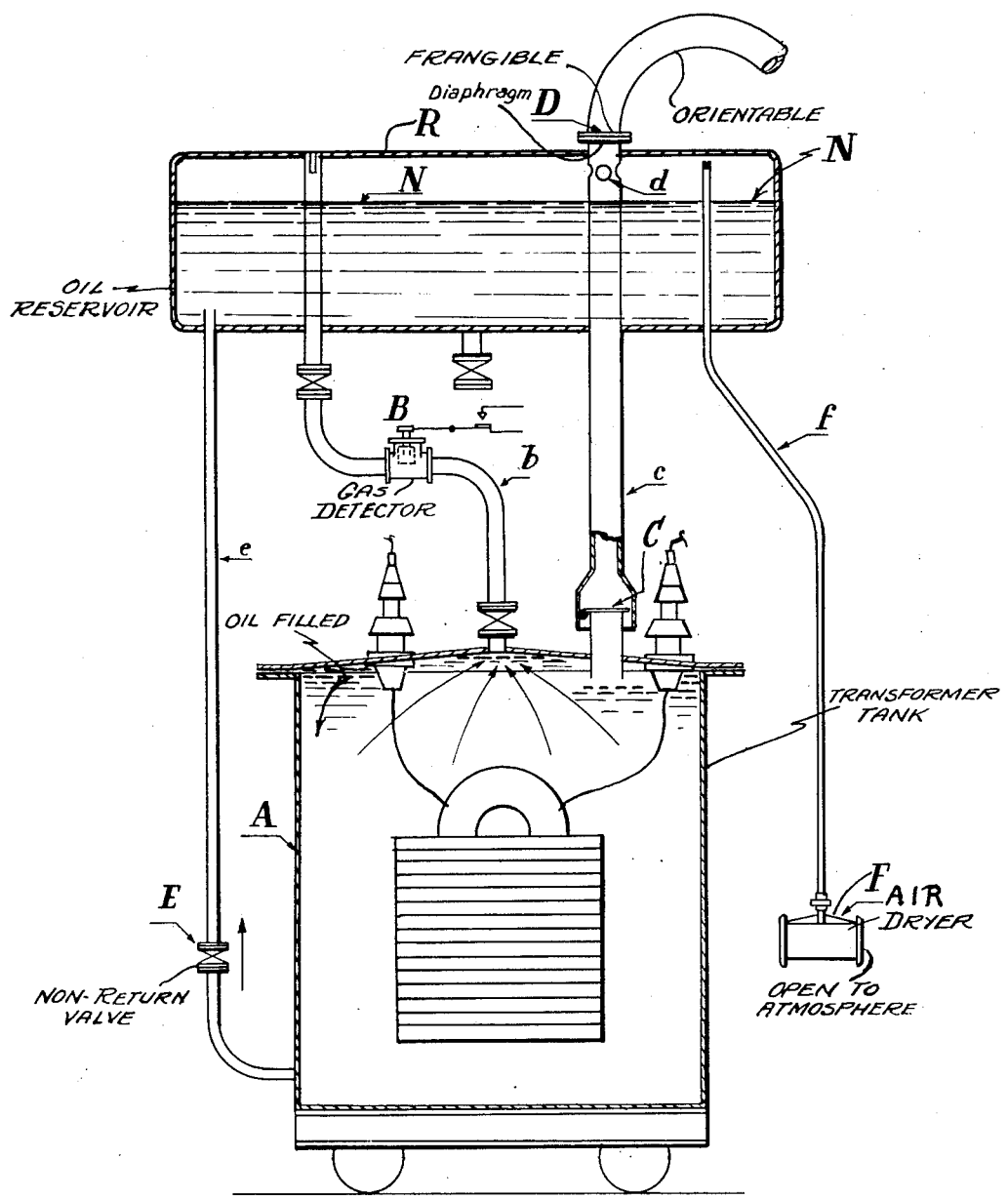

2,639,309

UNITED STATES PATENT OFFICE 2,639,309

SAFETY DEVICE FOR TRANSFORMERS WITH OIL RESERVOIR

Léon Egger, Aix-les-Bains, France, assignor to Societe Savoisienne de Constructions Electriques, Aix-les-Bains, France, a French corporation Application February 28, 1951, Serial No. 213,185
In France March 20, 1950

5 Claims. (Cl. 174—11)

This invention relates to safety devices and is concerned with an improvement in, or modification of, the invention disclosed in our co-pending application No. 105,431 of 1949.

In our co-pending application, there is provided a protection device for an oil bath transformer combined with an oil reservoir arranged above the transformer container; a pipe connecting the top of the container with the reservoir, said pipe carrying a float relay of the Buchholz or a similar type, this device being characterised in that the upper extremity of the pipe ends in the reservoir above the highest possible level of the oil therein and a second pipe starts from the lower part of the transformer container and passes through the reservoir, with which it communicates with two openings disposed at two different heights.

The present invention is concerned with a device which brings about various improvements, in respect of:

(a) The breathing of the electrical apparatus,
(b) The detection of gas and the signaling of defects by a float relay of the Buchholz type,
(c) The elimination of excessive pressure and
(d) The maintenance of cold oil in the reservoir.

According to the present invention there is provided a device for the protection of electrical apparatus immersed in an oil-filled container associated with an oil reservoir arranged above the said container, said device comprising gas-detecting means mounted on a first pipe, one end of which is connected to the highest point of the container, while the other end leads into the reservoir above the maximum oil level, a second pipe of large section which is connected to the cover of the container and which is closed by a diaphragm of low mechanical strength, and a third pipe of smaller section than the second, connecting the lower part of the container to the lower part of the reservoir.

For a better understanding of the invention and to show how the same may be carried into effect, reference will now be made to the accompanying drawing, which shows diagrammatically a device according to the invention.

The device comprises a container A completely filled with oil, in which apparatus such as a transformer is placed, the container A being connected to a reservoir R by three pipes, each of which is adapted to perform a single well-defined function, the system being partially filled with oil up to a level N:

1. A pipe $b$ is connected to a gas-detecting device B for initiating an alarm signal and an emergency operation. This pipe is connected to the highest point of the container A, while its upper end leads into the reservoir R above the maximum oil level. The device for detecting gas is constituted of a float relay of the Buchholz type comprising a chamber through which the oil can circulate and where there are collected the gases eventually produced in the tank A. A float is disposed in this chamber to cause the closing of an electrical contact when the volume of the collected gases in the chamber becomes sufficient to cause the float to drop to a determined level.

2. An explosion pipe $c$ of large section is connected to the upper part of the container A. The lower end of this pipe is extended to a few centimetres below the cover of the container A to avoid trapping the gases which must escape through the pipe $b$. In the example shown, the pipe $c$ communicates with the reservoir R through orifices $d$ situated in the neighborhood of the highest point of the said reservoir, by extending the said pipe through the reservoir.

The explosion pipe $c$ is closed, as in the above mentioned application by an explosion diaphragm D, which may consist of a very thin plate of a metal of low strength, such as aluminium. In the event of a sudden displacement of oil in the tank, the oil penetrates into the reservoir through the orifices $d$. If an even more violent movement of oil occurs owing to an unusual incident in the operation of the transformer, the jet of oil bursts the diaphragm. The bend in the pipe $c$, on the other side of the diaphragm D ensures that the oil is discharged in such a direction that the jet causes the least possible damage or is least likely to ignite. The bent portion of the pipe $c$ may be swiveled from one position to another.

In this embodiment, the pipe $c$ is also provided with a valve C located at its lower end in order to prevent any possibility of the circulation of hot oil due to convection currents, so that the oil remains cold above the said valve. In the event of explosion, this valve allows the jet of oil to pass without any appreciable loss of pressure.

In this form, the explosion pipe $c$ is very short and as the inertia of the oil contained therein is very low the discharge takes place with minimum difficulty in the event of an explosion.

3. Finally, a pipe $e$ of smaller section is provided solely to render possible the breathing caused by the expansion of oil during operation. This pipe extends from the bottom of the container A and terminates a few centimetres above the bottom of the reservoir R in order that it may not carry away the deposits in the said reservoir. In this embodiment, this pipe comprises an automatically closing non-return valve E adjusted to close only in the event of an abnormally large discharge of oil from the reservoir to the container of the transformer, which might occur through a considerable leakage in the container or through the breakage of a terminal.

4. The assembly is completed, as in the above mentioned application, by a tube $f$ affording communication between the reservoir and the ambient air through a dryer F.

I claim:

1. An improved protective device for a transformer immersed in a tank completely filled with oil associated with a container partially filled with oil and arranged above the tank, said device comprising a first pipe connecting the top of the tank with the top of the container, a second pipe connecting the lower part of the tank with the lower part of the container, said first pipe being provided with a gas detecting device having a float located in a chamber which collects the gas formed in the tank to cause electric contacts to operate by means of the float as soon as the collected gas attains a determined volume, said protective device comprising further a third straight tube of large cross section and substantially vertical which connects the upper part of the tank and the upper part of the container and which extends through the upper wall of said container and has an open end above said upper wall and is provided with a transverse diaphragm situated above the connection from said third pipe to said container and being constituted of a wall of small resistance.

2. A device according to claim 1, wherein said third pipe extends for several centimeters under the covering top of the tank of the transformer.

3. A device according to claim 1, wherein said third pipe traverses the container and communicates therewith by orifices situated in the vicinity of the highest part of the container between the diaphragm and the tank of the transformer.

4. A device according to claim 1, wherein said third pipe is terminated in its upper part by an orientable bend.

5. A device according to claim 1, wherein said third pipe comprises in its lower part a check valve which prevents a circulation of oil from said pipe to the tank of the transformer.

LÉON EGGER.

References Cited in the file of this patent

UNITED STATES PATENTS

| Number | Name | Date |
|---|---|---|
| 1,508,201 | Treanor | Sept. 9, 1924 |
| 1,642,398 | Buchholz | Sept. 13, 1927 |
| 1,642,408 | Buchholz | Sept. 13, 1927 |
| 1,723,916 | Brune | Aug. 6, 1929 |
| 1,794,893 | Graves | Mar. 3, 1931 |
| 2,274,388 | Venable | Feb. 24, 1942 |
| 2,447,883 | Whitman | Aug. 24, 1948 |